United States Patent [19]

Vigerstøl

[11] 4,422,031
[45] Dec. 20, 1983

[54] METHOD AND DEVICE FOR CHARGING AN ELECTRICAL ACCUMULATOR BATTERY BY MEANS OF SOLAR-CELLS

[75] Inventor: Ole K. Vigerstøl, Turramurra, Australia

[73] Assignee: SAB Nife AB, Landskrona, Sweden

[21] Appl. No.: 413,344

[22] PCT Filed: Dec. 16, 1981

[86] PCT No.: PCT/SE81/00376
§ 371 Date: Aug. 12, 1982
§ 102(e) Date: Aug. 12, 1982

[87] PCT Pub. No.: WO82/02121
PCT Pub. Date: Jun. 24, 1982

[30] Foreign Application Priority Data

Dec. 17, 1980 [SE] Sweden .......................... 8008899 0

[51] Int. Cl.³ .............................................. H02J 7/00
[52] U.S. Cl. .......................................... 320/2; 320/53; 320/59
[58] Field of Search ............... 320/2, 3, 4, 39, 43, 320/53, 57, 58, 59; 307/52, 53, 55, 317 R

[56] References Cited

U.S. PATENT DOCUMENTS 3,217,228  11/1965  Jardine ................................... 320/53
4,164,698   8/1979  Kleeberg ................................ 320/2
4,243,928   1/1981  Nazimek ................................. 320/2

FOREIGN PATENT DOCUMENTS 2646715  11/1977  Fed. Rep. of Germany .......... 320/2
 977836  11/1950  France ..................................... 320/2
 147961   6/1950  Sweden .................................... 320/2

Primary Examiner—William M. Shoop
Assistant Examiner—Anita M. Ault
Attorney, Agent, or Firm—Laurence R. Brown

[57] ABSTRACT

The invention relates to a method of charging an electrical accumulator battery (16) by means of solar panels (11-14) with solar-cells. The battery (16) is charged by means of two or more solar panels (11-14) included in charging branches connected in parallel, at least one charging branch being permitted to charge the accumulator battery to a higher voltage than the other charging branch or branches.

Only the charging branch or branches which charge to the highest voltage are permitted to deliver current to the acccumulator battery (16) during maintenance charging, when the accumulator battery is fully charged.

A device for carrying out the method consists of charging branches (11-21, 12-22, 13-23, 14-24) comprising at least one solar-cell panel and connected in parallel, the charging branches being adapted to deliver charging current at different voltages. At least one voltage is permitted to be higher than the other or others.

The charging branch (14-24) which delivers the highest voltage is adapted to deliver a voltage which is somewhat higher than the voltage of the fully charged accumulator battery.

3 Claims, 5 Drawing Figures

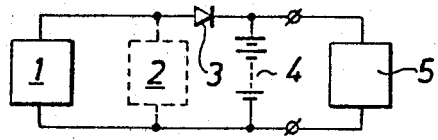
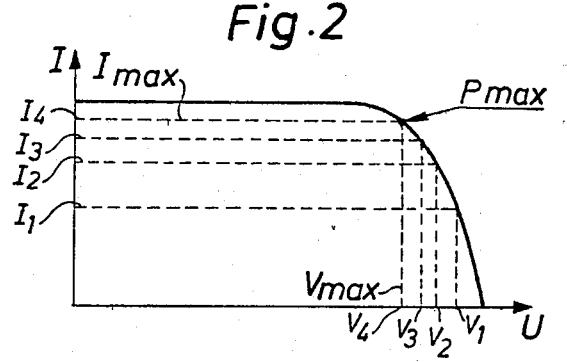
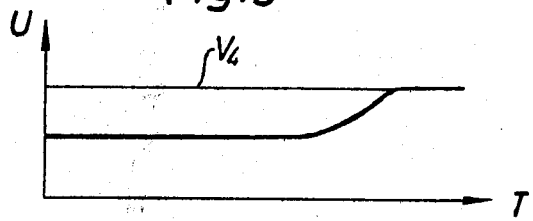
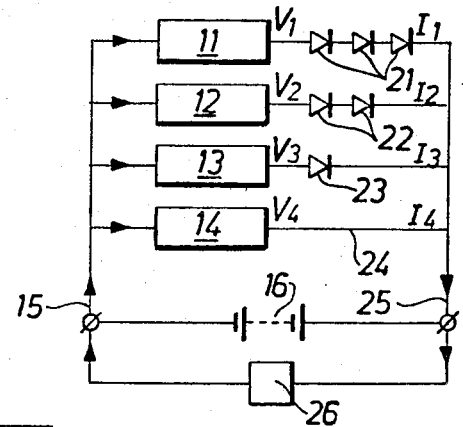
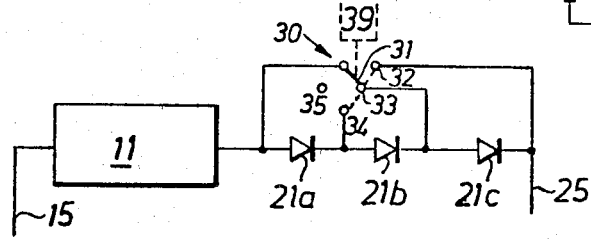

METHOD AND DEVICE FOR CHARGING AN ELECTRICAL ACCUMULATOR BATTERY BY MEANS OF SOLAR-CELLS

TECHNICAL FIELD

The present invention relates to a method and a device for charging an electrical accumulator battery by means of solar-cell panels. Such panels consist of a plurality of solar-cells which are coupled in series and/or in parallel so as to obtain a suitable voltage and current from the solar-cell panel.

PRIOR ART

Energy generators driven by solar-cells consist usually of a solar panel from which the generated current is conveyed to a battery to charge it. There is a charging regulator which, with a low terminal voltage at the battery during the charging, permits a higher current to charge the battery while, at the maximum voltage of the battery, the charging current is very low and serves as a maintenance current to compensate for self-discharge of the battery. A load is connected via the battery. When the load is connected and the battery is discharged, the terminal voltage drops. The charging regulator then regulates voltage and current from the solar panel to a suitable value in relation to the state of the battery.

Solar energy generators with solar-cells have manifold applications as power sources. It is typical of the majority of applications that the driven devices or measuring instruments are situated in remote and isolated places where no electrical energy is available. The size of the solar panels and batteries naturally varies within wide limits depending on the required installation. Examples of such unmanned installations where solar energy is used are telephone communication in the microwave range, slave stations for VHF radio, emergency radio transmitters, signals and safety equipment on railways, weather stations and other remotely situated measuring stations, navigation aids and other off-shore equipment, fire protection devices and fire alarms, cathode protection, electric fences etc.

Solar energy devices can be expected to work at extreme temperatures, both high and low. Despite this, the installation must be so reliable in operation that intervals in maintenance go up to a year or more.

A major problem is that the battery may be exposed to powerful overcharging when it has reached its fully charged state with maximum terminal voltage. The charging current then causes decomposition of the water in the electrolyte, which leads to the water being carried away. In hot regions, in in particular, this is a problem since the temperature is normally so high that a certain evaporation occurs. It is therefore necessary to regulate the charging voltage so that only insignificant overcharging occurs at the maximum terminal voltage of the battery. Heavy demands are thus imposed on the operational reliability and life of the charging regulator.

THE INVENTION

The object of the invention is to achieve rapid charging of batteries by means of high current intensities while at the same time the risk of water losses and disturbances in operation is minimized so that long service intervals are achieved, besides which the method discovered and the device intented have an astonishingly low cost.

While high current intensities can be caused during charging according to the invention, at the same time very low current intensities can also be used, particularly when the battery consists of nickel-cadmium cells.

This is brought about as a result of the fact that the battery is charged by means of two or more solar panels included in charging branches connected in parallel and having substantially the same power, one or more diodes being connected in series between at least one of the solar panels and the battery so that at least one charging branch is permitted to charge the accumulator battery to a higher voltage than the other charging branch or branches.

As a result, a high current intensity is obtained at the beginning of the charging and a low current intensity at the end of the charging which does not cause any appreciable decomposition of the water.

It is also possible to charge the battery as a result of the fact that only the charging branch or branches which charge to the highest voltages are permitted to deliver current to the accumulator battery during maintenance charging, when the accumulator battery is fully charged.

When the battery is partially discharged or when it is loaded, a plurality of charging branches can be permitted to deliver current to the accumulator battery.

The method invented may appropriately be carried out by means of a special device for charging an electrical accumulator battery by means of solar-cells containing solar panels with charging branches comprising at least one solar-cell panel connected in parallel, the charging branches being adapted to deliver charging current at different voltages, and at least one voltage being permitted to be higher than the other or others.

According to one embodiment of the invention, the charging branch which is adapted to deliver the highest voltage is adapted to deliver a voltage which is somewhat higher than the voltage of the fully charged accumulator battery.

According to another embodiment, all the charging branches are adapted to deliver successively higher voltages.

In another embodiment of the invention, a change-over switch may be provided to connect one or more diodes in series between one or more panels and the battery or a control device for each change-over switch for the automatic connecting of the diodes depending on the charging voltage of the battery.

With a device according to the invention, the water loss in the battery can be restricted to a minimum. As an example, it may be mentioned that 8 hours solar radiation per day, which can be regarded as a normal maximum, with a certain capacity of the solar panel corresponds to about 1460 Ah overcharging per annum and a corresponding water loss of 487 ml. A standard nickel-cadmium battery at 200 Ah may have an electrolyte reserve of 700 ml. Therefore under difficult conditions, such a battery can be used for more than 1.5 years without refilling.

BRIEF DESCRIPTION OF THE DRAWING

The invention will be described in more detail with reference to the accompanying drawings in which:

FIG. 1 shows a conventional solar energy generator,

FIG. 2 shows the relation between the voltage and current of a solar-cell panel with constant irradiation of solar energy, FIG. 3 shows the necessary charging voltage for charging a battery, FIG. 4 shows a device according to the invention, and FIG. 5 shows an alternative embodiment of the invention.

DESCRIPTION OF PREFERRED EMBODIMENTS

In FIG. 1 a solar panel with solar-cells is designated by 1, whereas 2 is a possible charging regulator and 3 is a blocking diode. The battery is designated by 4 and the load or device driven by the battery and the solar-cell panel by 5.

FIG. 2 shows the electrical characteristics for the relation between the voltage U and the current I which are delivered by a solar-cell panel with constant solar irradiation. The Figure shows successive voltages $V_1$–$V_4$ and the associated current values $I_1$–$I_4$. The maximum power $P_{max}$ is obtained at a point where the curve begins to incline downwards and the corresponding current and voltage values are $I_{max}$ and $V_{max}$. It is naturally desirable that the solar-cells should work with the maximum power $P_{max}$. This can be achieved by series and parallel connection, in a suitable manner, of indivudal solar-cell elements.

FIG. 3 shows the charging voltage U of the battery 4 depending on the charging time T. In a completely or partially discharged state, the voltage is low rising to the maximum terminal voltage of the battery at the end of the charging. At the end of the charging, the charging voltage rises steeply and then flattens out.

In order to utilize the output of the solar-cells in the best manner, the number of cells in the accumulator battery which is to be charged should be selected so that the charging voltage of the battery is about $V_{max}$. If the number of cells in the battery is selected so that the voltage at the beginning of the charging of a discharged battery is $V_{max}$, the current drops to a great extent in the course of the charging and the energy of the solar-cells is poorly utilized and the charging of the battery becomes incomplete. On the other hand, if the number of cells is selected so that $V_{max}$ is only reached at the end of the charging, the whole current $I_{max}$ is supplied to a large extent to the battery for maintenance charging, in which case the water consumption becomes troublesome.

FIG. 4 shows one embodiment of the invention. In order to charge the battery in a relative short time without causing unacceptable water consumption, in the solar energy generator shown, four similar standard solar-cell panels 11, 12, 13 and 14 are connected in parallel between two outging conductors 15 and 25. In the example shown, three standard diodes 21 are connected in series one after the other in the outgoing circuit of the panel 11. The solar-cell panel 12 has two standard diodes 22 in its outgoing circuit, the panel 13 has one diode 23 and the panel 14 is directly connected to the battery.

As mentioned earlier, the number of cells in the battery is selected so that the battery voltage at full charge is close to $V_{max}$, see FIG. 2. If the battery is not fully charged, its voltage is so low, under $V_{max}$ in FIG. 2, that all the panels deliver substantially equally heavy currents, as a result of which the total charging current to the battery is high.

When the battery approaches full charge, the battery voltage approaches $V_{max}$, see FIG. 3. The panel 14 then charges the battery with almost the optimum power, according to FIG. 2. The panel 13 has a diode 23 connected in series with the battery. The voltage drop across the diode then means that the voltage $V_3$ is higher than $V_4$, and, according to FIG. 2, the current $I_3$ delivered by the panel is lower than $I_4$. The currents from the panels 12 and 11 are further reduced in a corresponding manner.

This means that the panels deliver a low maintenance current which maintains the charge of the battery 16 and compensates for the self-discharge which normally occurs in the battery. Thus an automatic current limitation is obtained with a high charging voltage at the battery.

FIG. 5 shows an alternative embodiment of the circuit with series connection of the solar-cell panel 11 and the diodes 21. An arbitrary number of diodes 21a, 21b and 21c can be connected in series or connected completely in shunt by means of a change-over switch with one arm 31 and four contacts 32, 33, 34 and 35. In the Figure, the arm 31 is connected to the contact 33 which means that the diodes 21a and 21b are by-passed. Current from the panel 11 only flows through the diode 21c. When the arm 31 is connected to the contact 32, all the diodes 21a–21c are out of operation and when it is connected to the contacts 34 and 35, the diodes 21b and 21c or 21a, 21b and 21c respectively are connected.

In FIG. 5, a control device 39 is indicated in broken lines and controls the change-over switch 30 depending on the charging voltage of the battery.

The expert can find other methods and devices within the scope of the following claims.

I claim:

1. A device for charging an electrical accumulator battery by means of solar panels containing solar-cells characterised by a plurality of charging branches connected in parallel, each comprising at least one solar-cell panel, which charging branches contain solar-cell panels of substantially the same power, and in which branches at least one diode is respectively connected in series between at least some of the solar panels and the battery to constitute the sole switching means for disconnecting the solar panels in the respective branches automatically in response to variations in battery voltage, the charging branches being adapted to deliver charging current at different voltages with at least one voltage from one of the panels by means of the diodes being higher than the others.

2. A device as claimed in claim 1, characterised in that the charging branch which is adapted by the diodes to deliver the highest voltage, is adapted to deliver a voltage which is somewhat higher than the voltage of the fully charged accumulator battery.

3. A device as claimed in either claim 1 or 2, characterised in that all the charging branches are adapted by the diodes to deliver successively higher voltages.

* * * * *

UNITED STATES PATENT OFFICE
CERTIFICATE OF CORRECTION

PATENT NO. : 4,422,031
DATED : December 20, 1983
INVENTOR(S) : Ole Kjell VIGERSTOL It is certified that error appears in the above-identified patent and that said Letters Patent are hereby corrected as shown below:

Kindly correct the Assignee to read as follows:

--Nife Jungner AB, Oskarshamn, Sweden --.

Signed and Sealed this

Thirteenth Day of March 1984

[SEAL]

Attest:

GERALD J. MOSSINGHOFF

*Attesting Officer*  *Commissioner of Patents and Trademarks*